US012663148B1

(12) United States Patent
Francisco

(10) Patent No.: US 12,663,148 B1
(45) Date of Patent: Jun. 23, 2026

(54) MOUNTING FEATURES ON SEALING RING COMPONENT OR POOL LIGHT NICHE HOUSING

(71) Applicant: Mike Francisco, Richmond, IL (US)

(72) Inventor: Mike Francisco, Richmond, IL (US)

( * ) Notice: Subject to any disclaimer, the term of this patent is extended or adjusted under 35 U.S.C. 154(b) by 0 days.

(21) Appl. No.: 19/074,309

(22) Filed: Mar. 7, 2025

Related U.S. Application Data

(60) Provisional application No. 63/562,460, filed on Mar. 7, 2024.

(51) Int. Cl.

| | |
|---|---|
| ***F21V 31/00*** | (2006.01) |
| *E04H 4/14* | (2006.01) |
| *F21W 131/401* | (2006.01) |

(52) U.S. Cl.
CPC ............ *F21V 31/005* (2013.01); *E04H 4/148* (2013.01); *F21W 2131/401* (2013.01)

(58) Field of Classification Search
CPC .. F21V 31/005; F21W 2131/406; E04H 4/148
See application file for complete search history.

(56) References Cited

U.S. PATENT DOCUMENTS

| | | | | |
|---|---|---|---|---|
| 6,250,776 | B1 * | 6/2001 | Burkitt | F21V 31/00 362/147 |
| 2011/0089645 | A1 * | 4/2011 | White | F16J 15/02 277/637 |
| 2017/0051903 | A1 * | 2/2017 | Maglica | F21V 23/0492 |
| 2018/0087741 | A1 * | 3/2018 | McFadyen | F21V 23/0442 |
| 2018/0223553 | A1 * | 8/2018 | Thompson | F21V 17/12 |
| 2018/0238533 | A1 * | 8/2018 | Dyck | H05B 47/19 |
| 2021/0080097 | A1 * | 3/2021 | Becker | F21V 31/00 |

* cited by examiner

*Primary Examiner* — Tracie Y Green
*Assistant Examiner* — Michael Chiang
(74) *Attorney, Agent, or Firm* — Allison M. Corder

(57) ABSTRACT

Improved mounting features on a sealing ring component or niche housing for an underwater pool light. The prior art sealing rings and/or housings only offer one hole and one notch to install a light fixture. If the hole and/or notch fail, the entire sealing ring or housing must be repaired or replaced. The improved mounting features of a sealing ring component or housing include additional mounting features providing alternative locations to attach the light fixture. The light fixture may be disconnected and rotated within the housing to engage with different mounting features to re-attach the light fixture.

12 Claims, 8 Drawing Sheets

MOUNTING FEATURES ON SEALING RING COMPONENT OR POOL LIGHT NICHE HOUSING

CROSS-REFERENCE TO RELATED APPLICATIONS

This application claims the benefit of U.S. Provisional Application No. 63/562,460 filed Mar. 7, 2024.

FIELD OF THE INVENTION

The invention relates to underwater lights such as those used in bodies of water such as pools including water spas such as hot tubs. More specifically, the invention relates to improved mounting features on a sealing ring component or niche housing for an underwater pool light.

BACKGROUND OF THE INVENTION

A swimming pool, or simply pool, is a structure such as a tank or basin designed to hold water to enable swimming or other activities. Many pools have underwater lights for night swimming or aesthetics. Most pool lights include a niche, or niche housing for the pool light. Niches are typically installed during construction of a pool. A light fixture is placed within the niche housing and includes electrical wiring connected between the light fixture and a junction box.

Typically, there are three types of pool light niche housings that include mounting features configured to assemble pool lights, or pool light fixtures.

First, is a housing used with vinyl pool applications. These housings (FIG. 1) assemble with vinyl sealing rings (FIG. 2), as shown in FIG. 3, such as using screws.

Second, is a housing used with concrete pool applications. The concrete sealing rings (FIG. 4) are assembled to concrete housings as shown in FIG. 5, but are more securely fastened using rivets.

The sealing rings used with either of these above two described applications can be removed from the housing when a failure occurs and is replaced. Failures occur when the mounting features deteriorate or break such that the light fixture is no longer securely assembled to the housing.

Lastly, is a housing used with vinyl pool applications that includes the mounting features integrated with the housing. The sealing rings used in these embodiments do not include the mounting features. See FIG. 6.

A sealing ring is used to prevent leaking. A sealing ring may be a separate component used to seal the liner around the light niche to prevent leaking such as with vinyl pool applications, or the sealing ring may be integrated with the light niche such as with concrete pool applications. It should be noted that a gasket may also be used with the sealing ring and light niche assembly. Niche housings are typically constructed from stainless steel or plastic. Sealing rings are known to be plastic and chrome plated brass.

As shown in FIG. 1, the housing 100 includes an interior space 125 into which the light fixture is positioned. Generally, the housing 100 has openings 135 positioned around its perimeter boundary 130.

FIG. 2 illustrates a conventional sealing ring 150 used with the housing 100 shown in FIG. 1. Again, a sealing ring 150 may be used to seal a pool liner around the light niche to prevent leaking. The sealing ring 150 includes apertures 155 that align with the openings 135 of the housing 100 for assembly.

In addition to the apertures 155 evenly spaced around the ring 150, the sealing ring 150 also includes other mounting features 160, 170 used to securely install a pool light in the interior space 125 of the niche housing 100. First mounting feature 160 includes a hole 165 and second mounting feature 170 includes a notch 175.

FIG. 3 illustrates a sealing ring 150 assembled to the niche housing 100 secured using hardware such as screws 25. As seen, apertures 155 of sealing ring 150 align with the openings 135 of the housing 100 for assembly.

FIG. 4 illustrates a sealing ring 250 typically used with concrete pool applications according to the prior art. The sealing ring 250 includes clamps 255 that align and engage with holes 235 of the housing 200 for assembly as shown in FIG. 5.

In addition to the clamps 255, the sealing ring 250 also includes other mounting features 260, 270 used to securely install a pool light in the interior space 225 of the niche housing 200. First mounting feature 260 includes a hole 265 and second mounting feature 270 includes a notch 275.

FIG. 6 illustrates another prior art light niche housing 300 used with vinyl pool applications. These housings 300 used with vinyl pool applications include the mounting features 360, 370 integrated with the housing such that the sealing rings used in these embodiments do not include the mounting features like the rings of FIG. 2 and FIG. 4. Specifically, hole 365 and notch 375 are located within the housing 300.

FIG. 7 illustrates a light fixture 50 known in the prior art. The light fixture 50 includes a bulb, lens, and plate 51 with the plate including a mounting opening 53 and clip feature 55.

FIG. 8 illustrates the light fixture 50 of FIG. 7 installed within the interior space 125 of the niche housing 100 (FIG. 3) or interior space 225 of housing 200 (FIG. 5) or interior space of 325 of housing 300 (FIG. 6). Specifically, the clip feature 55 of the fixture 50 is guided into the second mounting feature 170, 270, 370 such that the clip feature 55 resides within the notch 175, 275, 375 to prevent the light fixture from moving, such as rotating, and to achieve a tight fit between the fixture and the housing. To further secure the light fixture within the housing, opening 53 aligns with the first mounting feature 160, 260, 360 such that opening 53 is secured to hole 165, 265, 365 with hardware such as a screw.

Problems with current sealing rings and/or housings is that they provide only one mounting configuration. If the mounting features experience deterioration or failure such as complete breakage, the light fixture is not secure and may become partially or completely disassembled from the housing. When this occurs, a light wedge or adapter ring must be used to re-install the light.

Another option is to drain the pool so that the sealing ring and/or housing can be replaced. However, this may lead to additional issues such as the liner moving during replacement causing misalignment of the openings. This may cause leakage into the housing or light fixture, and especially if a gasket is not used.

Yet another issue with current ring components and/or housings is derived from the materials from which they are fabricated. These materials corrode with exposure to chlorine and weather elements such as when a pool is drained. And the current materials used easily tarnish and weaken particularly in saltwater pools.

What is needed is improved mounting features on a sealing ring component or niche housing for an underwater pool light that overcomes these problems. The invention satisfies this need.

BRIEF SUMMARY OF THE INVENTION

A sealing ring component or pool light niche housing include improved mounting features according to the invention. A plurality of mounting features, i.e., more than one hole and more than one notch found in the sealing rings of the prior art. While the invention may be fabricated from materials known to be used with existing products such as stainless steel, chrome plated brass, hard plastic like polyvinyl chloride (PVC), a new material fabrication that is more durable and cost effective is nickel plated aluminum, which withstands longer from exposure to chemicals such as chlorine and further resists corrosion from salt water.

The improved mounting features may be located on a sealing ring component or integrated with a light niche housing and easily used with pools constructed of vinyl or concrete.

Another advantage of the invention is that deterioration or failure of the sealing ring is minimized. Hence, the need for a light wedge or adapter ring is eliminated.

Another advantage is that the invention increases longevity and serviceability. A pool is not required to be drained to replace the sealing ring. Instead, the light fixture is simply disconnected and rotated within the housing to engage with additional mounting features provided on the sealing ring component or housing.

The invention and its attributes and advantages will be further understood and appreciated with reference to the accompanying drawings.

BRIEF DESCRIPTION OF THE FIGURES

The preferred embodiments of the invention are described in conjunction with the attached figures that illustrate embodiments of the invention.

DETAILED DESCRIPTION OF THE INVENTION

With prior art sealing rings and/or housings only offer one hole and one notch to install a light fixture, if the hole and/or notch fail, the entire sealing ring or housing must be repaired or replaced. The improved mounting features of a sealing ring component or housing include additional mounting features providing alternative locations to attach the light fixture. The light fixture may be disconnected and rotated within the housing to engage with different mounting features to re-attach the light fixture.

The improved mounting features may be used on a sealing ring and/or housing for use with both vinyl pool and concrete pool applications.

Figure 9:
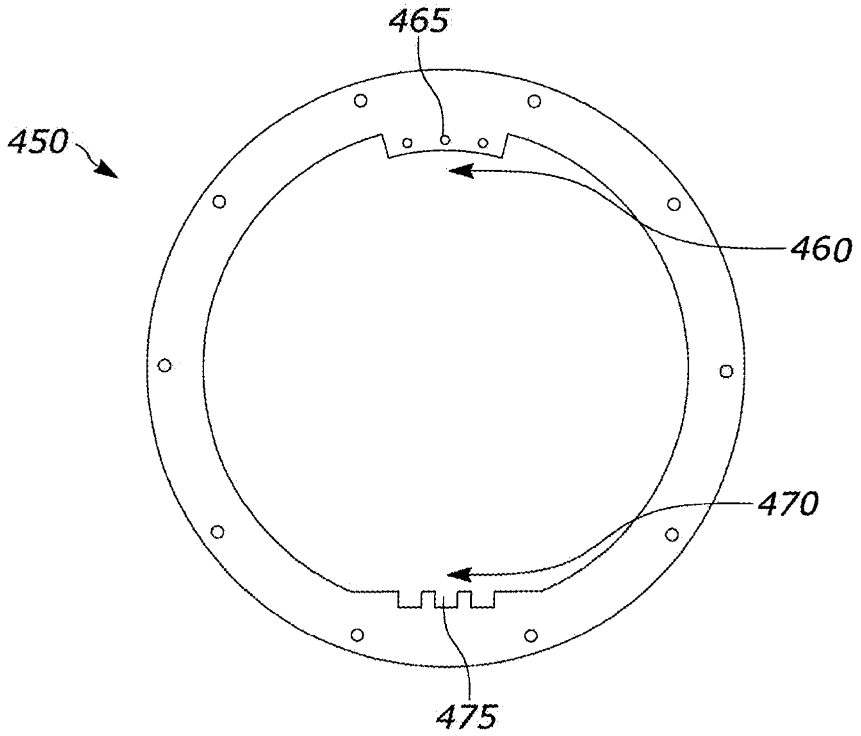
FIG. 9 illustrates an improved sealing ring component according to the invention, typically used with vinyl pool applications.

FIG. 9 illustrates an improved sealing ring component 450 according to the invention, typically used with vinyl pool applications. As shown, sealing ring component includes a first mounting feature 460 including a plurality of holes 465 and a second mounting feature 470 including a plurality of notches 475.

Figure 10:
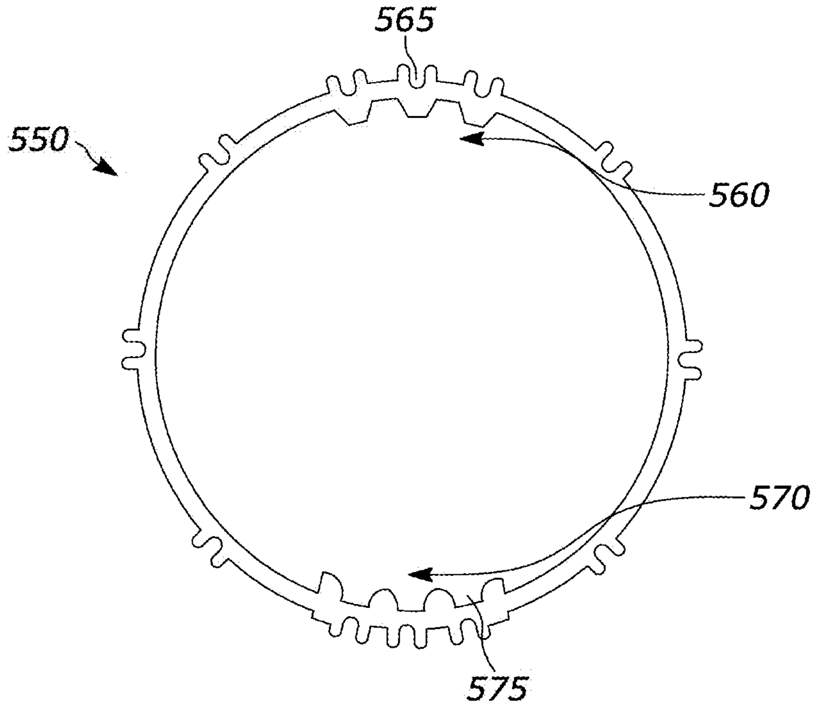
FIG. 10 illustrates another embodiment of an improved sealing ring component according to the invention, typically used with concrete pool applications.

As used with concrete pool applications, FIG. 10 illustrates another embodiment of an improved sealing ring component 550 that includes a first mounting feature 560 including a plurality of holes 566 and a second mounting feature 570 including a plurality of notches 575.

For purposes of this application, the mounting features are described in reference to the improved sealing ring shown in FIG. 9, but it is contemplated that the improvements are equally applicable to the embodiment shown in FIG. 10.

Figure 11:
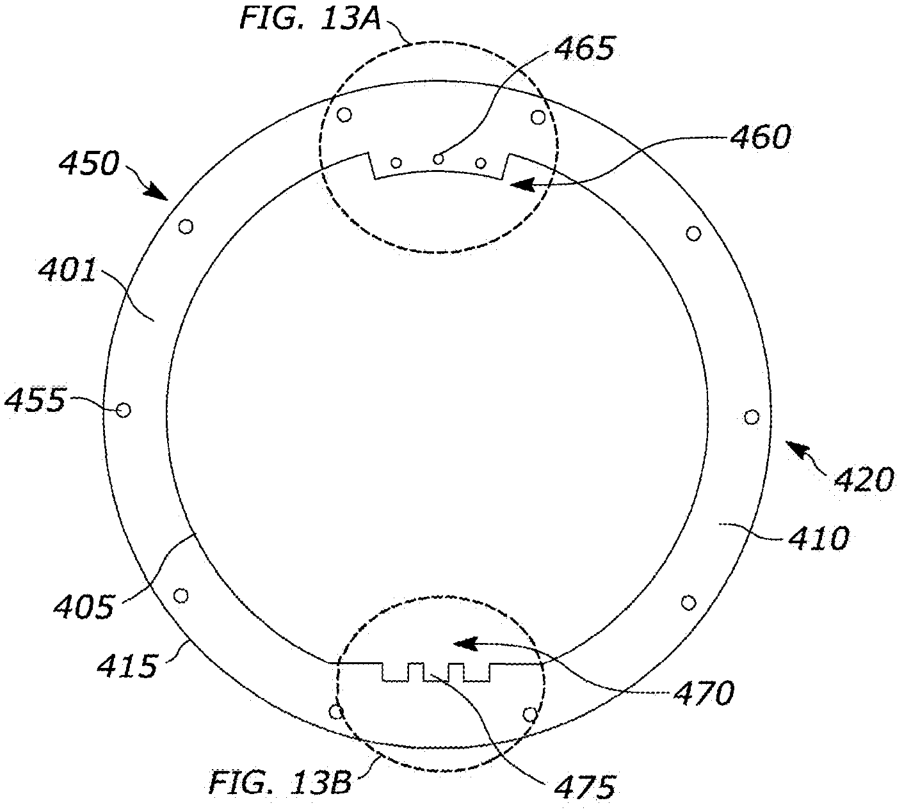
FIG. 11 illustrates a front view of the sealing ring component shown in FIG. 9.

FIG. 11 illustrates a front view of the improved sealing ring component shown in FIG. 9. The improved sealing ring component 450 includes a body 401 in the form of a ring defined by a top surface 410 and bottom surface 420, and inside surface 405, and an outside surface 415.

The improved sealing ring component 450 comprises a plurality of installation apertures 455 located through both the top surface 410 and the bottom surface 420. The apertures 455 are configured to align with the openings 135 of the housing 100 (see FIG. 1) during assembly.

The sealing ring 450 also includes other mounting features used to securely install a pool light fixture in the housing. A first mounting feature 460 includes two or more hole elements 465 and a second mounting feature 470 includes two or more notch elements 475, more clearly shown and described in the detailed views of FIG. 13A and FIG. 13B, respectively.

Figure 12:
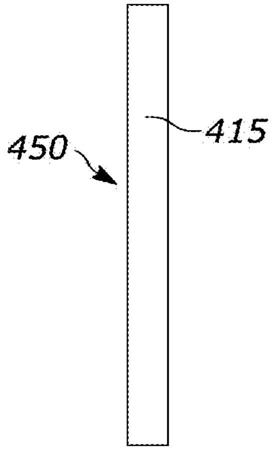
FIG. 12 illustrates a side view of the sealing ring component shown in FIG. 9.

FIG. 12 illustrates a side view of the improved sealing ring component shown in FIG. 9. A side view of the improved sealing ring component 450 showing the outside surface 415.

Figure 13A:
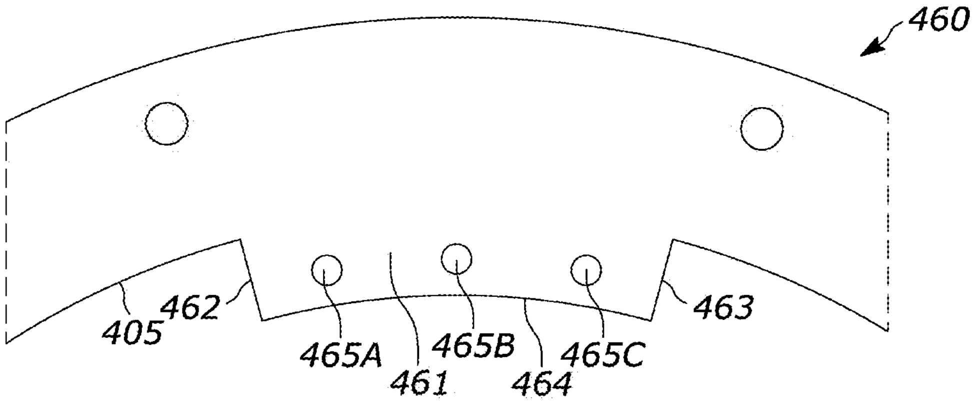
FIG. 13A illustrates a detailed view of the improved first mounting feature on a sealing ring component according to the invention.
Figure 13B:
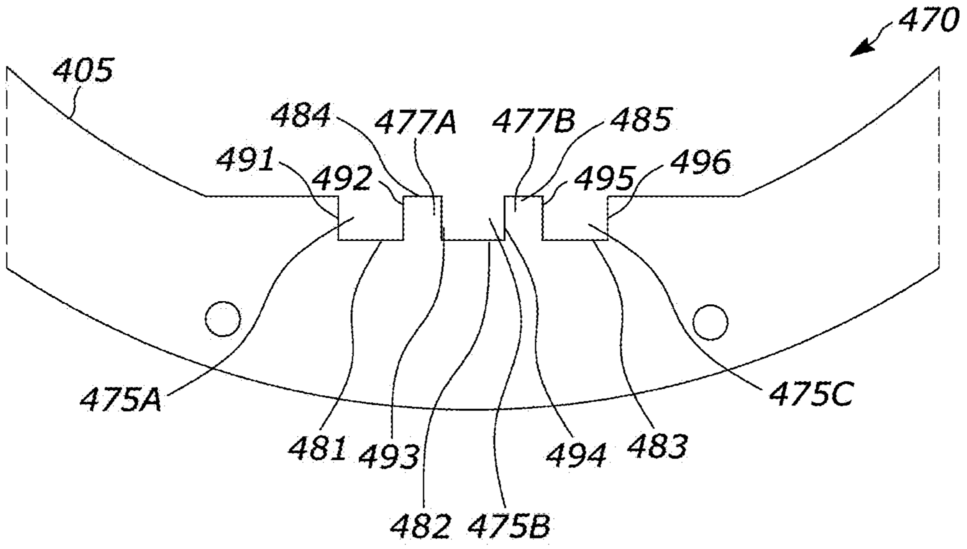
FIG. 13B illustrates a detailed view of the improved second mounting feature on a sealing ring component according to the invention.

FIG. 13A illustrates a detailed view of the first mounting feature 460 and FIG. 13B illustrates a detailed view of the second mounting feature.

As shown in FIG. 13A, a tab element 461 protrudes from the inside surface 405 and is defined by a first border 462 substantially parallel to a second border 463 connected by a perpendicular third border 464. The three hole elements 460—a first hole element 465A, a second hole element 465B, a third hole element 465C—are shown spaced together on the tab element 461, however any number of hole elements is contemplated.

Figure 15:
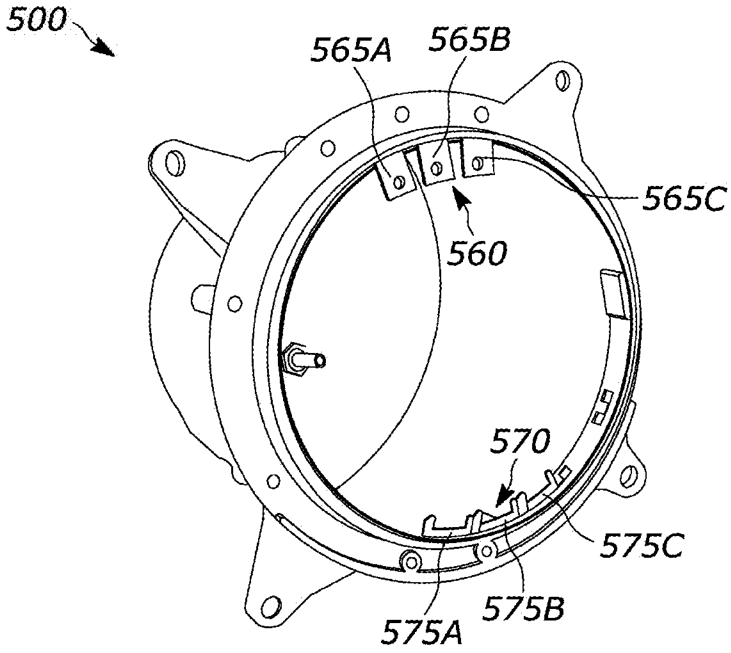
FIG. 15 illustrates another embodiment of the invention in which the mounting features are integrated with the housing.

Any number of tab elements is contemplated, for example three tab elements 565A, 565B, 565C shown in FIG. 15. However, the plurality of mounting apertures 465A, 465B, 465C positioned on a single tab element 461 provides a surface that has an area greater than that found on conventional ring components. This larger area increases the strength and durability of the mounting apertures and minimizes deterioration and failure such as complete breakage of the mounting aperture.

While three notch elements 470—a first notch element 475A, a second notch element 475B, third notch element 475C—are shown spaced together and located across from (180 degrees) or in vertical alignment with the hole elements 460, any number of notch elements is contemplated.

For example, the improved mounting features may include more than three hole elements and more than three notch elements. And it is further contemplated that a different number of each may be used, for example, 5 hole elements and 4 notch elements or 2 hole elements and 3 notch elements. However, three hole elements and three notch elements provide two additional mounting configurations that are positioned near the hole and notch existing in the prior art, and prevent the light fixture from being over-rotated before re-attachment which may cause a misdirected and undesirable light beam.

As shown more specifically in FIG. 13B, each notch element is defined by three wall elements. A first notch element 475A is defined by a first wall 491 substantially parallel to a second wall 492 connected by perpendicular third wall 481. A second notch element 475B is defined by a fourth wall 493 substantially parallel to a fifth wall 494 connected by perpendicular sixth wall 482. A third notch element 475C is defined by a seventh wall 495 substantially parallel to a eighth wall 496 connected by perpendicular ninth wall 483. The notch elements 475A, 475B, 475C form two flange elements 477A, 477B protrude from the inside surface 405. The first flange element 477A is formed by walls 492, 493 and first border 484. The second flange element 477B is formed by walls 494, 495 and second border 485.

Figure 1:
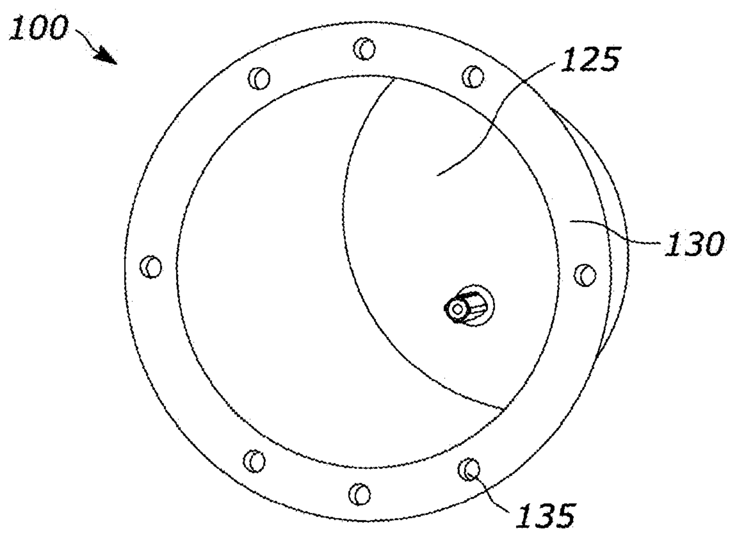
PRIOR ART FIGURE 1
FIG. 1 illustrates a plastic pool light niche housing typically used with vinyl pool applications according to the prior art.
Figure 2:
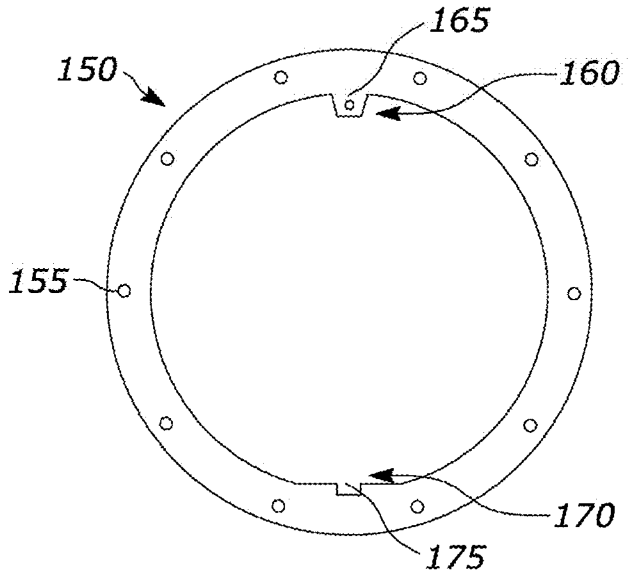
PRIOR ART FIGURE 2
FIG. 2 illustrates a sealing ring typically used with the housing shown in FIG. 1 according to the prior art.
Figure 3:
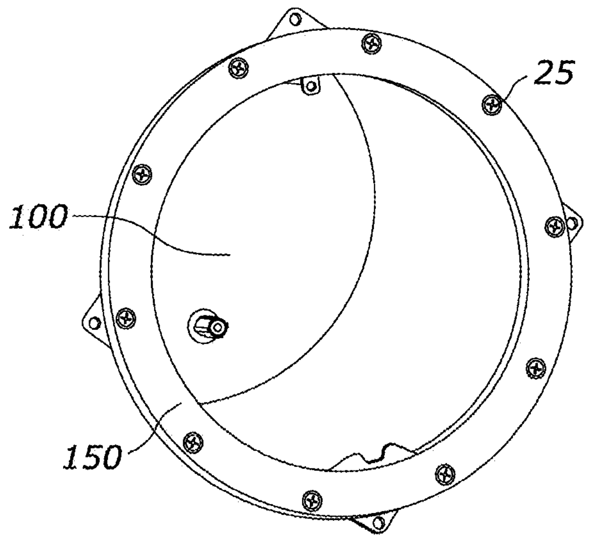
PRIOR ART FIGURE 3
FIG. 3 illustrates a sealing ring of FIG. 2 assembled to a pool light niche housing of FIG. 1 according to the prior art.
Figure 4:
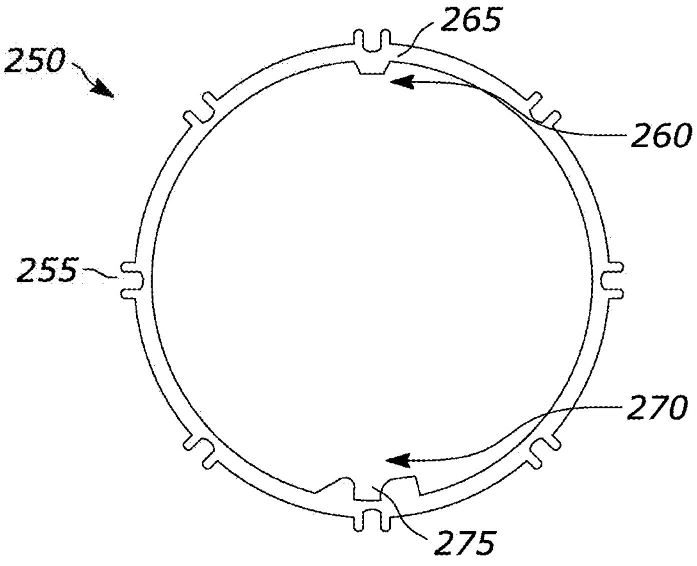
PRIOR ART FIGURE 4
FIG. 4 illustrates a sealing ring typically used with concrete pool applications according to the prior art.
Figure 5:
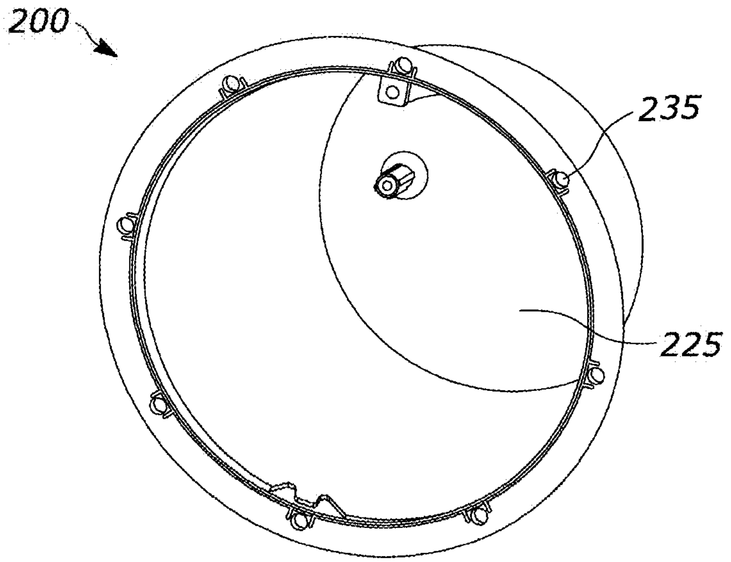
PRIOR ART FIGURE 5
FIG. 5 illustrates a sealing ring of FIG. 4 assembled to a concrete light niche according to the prior art.
Figure 6:
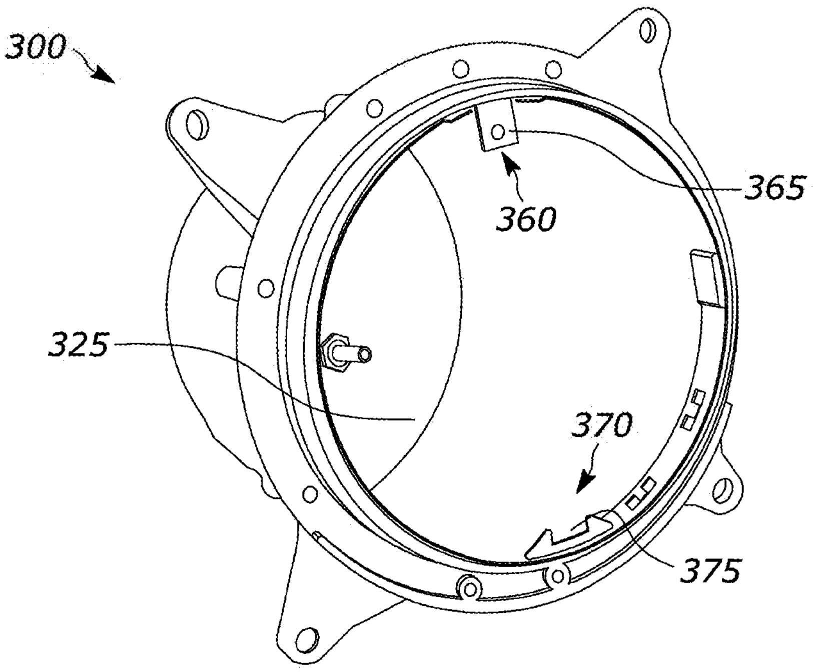
PRIOR ART FIGURE 6
FIG. 6 illustrates another prior art light niche housing used with vinyl pool applications.
Figure 7:
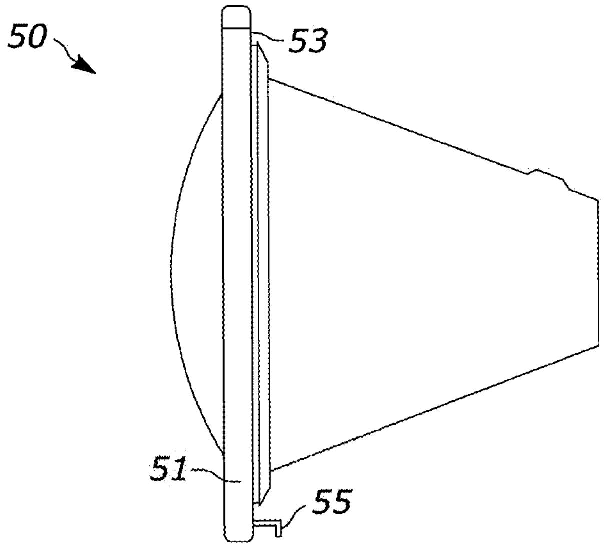
PRIOR ART FIGURE 7
FIG. 7 illustrates a light fixture according to the prior art.
Figure 8:
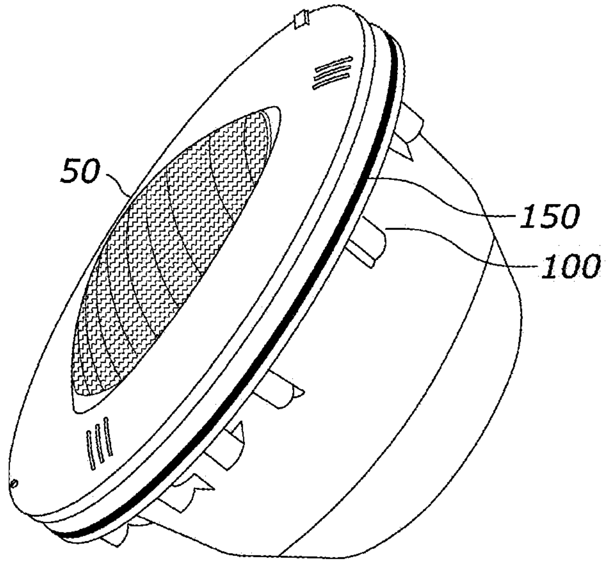
PRIOR ART FIGURE 8
FIG. 8 illustrates a light fixture assembled to the pool light niche housing as shown in FIG. 3 according to the prior art.
Figure 14:
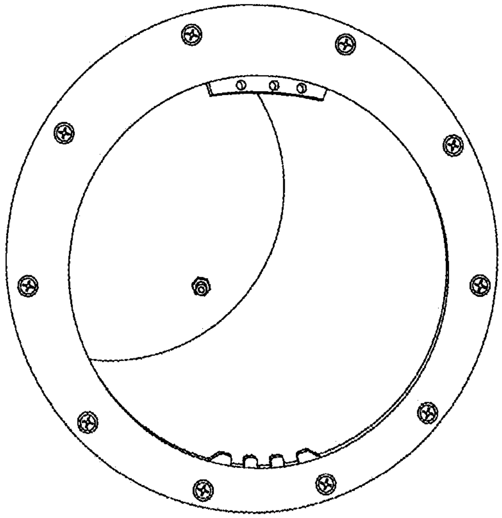
FIG. 14 illustrates an embodiment of the sealing ring according to the invention assembled to a housing.

FIG. 14 illustrates the sealing ring 450 according to the invention assembled to a housing 100 (FIG. 1).

FIG. 15 illustrates another embodiment of the invention in which the mounting features are integrated with the housing. Tab elements 560 are shown as individual tab elements 565A, 565B, 565C. And the notch elements 570 are shown as three notch elements 575A, 575B, 375C positioned across (at 180 degrees) from the hole elements 560.

The improved mounting features provide alternative locations to position the light fixture when a failure occurs. The light fixture is disconnected and rotated within the housing to align with different mounting features on an improved sealing ring component or improved housing and the light fixture re-attached. Specifically, the light fixture may be rotated a distance (e.g., ¼"-¾") in either direction to align and mount the light fixture to one of the plurality of mounting apertures.

The improved mounting features of a ring component or housing component may be fabricated from any durable material or combination of materials that withstand water erosion such as rubber, plastic, galvanized steel, to name a few. The material may further be coated or dipped in the same or different material to increase durability and withstand corrosion. In a preferred embodiment, the ring component or housing component is fabricated completely or partially from a nickel plated aluminum.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. An improved sealing ring component for a pool light niche housing, the improved sealing ring component providing a plurality of mounting features configured for attachment with a light fixture, comprising:

a body in the form of a ring defined by a top surface, a bottom surface, an inside surface, and an outside surface;

a first mounting feature extending from the inside surface toward a center of the ring, a second mounting feature extending from the inside surface toward the center of the ring, the first mounting feature in vertical alignment with the second mounting feature, the first mounting feature including two or more hole elements, the second mounting feature including two or more notch elements, wherein each hole element is positioned 180 degrees from a notch element, the light fixture configured to be rotated within the pool light niche housing and attachable to both a selected hole element and the notch element positioned 180 degrees from the selected hole element.

2. The improved sealing ring component for a pool light niche housing according to claim 1 fabricated from nickel plated aluminum.

3. The improved sealing ring component for a pool light niche housing according to claim 1 wherein the two or more hole elements are located on a tab element that protrudes from the inside surface and is defined by a first border substantially parallel to a second border, with the first border and the second border connected by a perpendicular third border.

4. The improved sealing ring component for a pool light niche housing according to claim 1, wherein each notch element is defined by three wall elements.

5. The improved sealing ring component for a pool light niche housing according to claim 4, wherein a first notch element is defined by a first wall substantially parallel to a second wall connected by perpendicular third wall, and a second notch element is defined by a fourth wall substantially parallel to a fifth wall connected by perpendicular sixth wall, and a third notch element is defined by a seventh wall substantially parallel to a eighth wall connected by perpendicular ninth wall.

6. The improved sealing ring component for a pool light niche housing according to claim 5, wherein the first notch element, the second notch element, and the third notch element form two flange elements that protrude from the inside surface.

7. The improved sealing ring component for a pool light niche housing according to claim 6, wherein the first flange element is formed by the second wall, the fourth wall and a first border, and the second flange element is formed by the fifth wall, the seventh wall, and the second border.

8. The improved sealing ring component for a pool light niche housing according to claim 1 wherein the first mounting feature consists of three hole elements and the second mounting feature consists of three notch elements.

9. An improved sealing ring component for a pool light niche housing, the improved sealing ring component providing a plurality of mounting features configured for attachment with a light fixture, comprising:

a body in the form of a ring defined by a top surface, a bottom surface, an inside surface, and an outside surface;

a first mounting feature extending from the inside surface toward a center of the ring, the first mounting feature consisting of three hole elements, a second mounting feature extending from the inside surface toward the center of the ring, the second mounting feature consisting of three notch elements, a first hole element is positioned 180 degrees from a third notch element, a second hole element is positioned 180 degrees from a second notch element, a third hole element is positioned 180 degrees from a first notch element, the light fixture configured to be rotated within the pool light niche housing and attachable to one of the three hole elements and attachable to one of the three notch elements.

10. The improved sealing ring component for a pool light niche housing according to claim 9 wherein the three hole elements are located on a tab element that protrudes from the inside surface, the tab element defined by a first border substantially parallel to a second border, with the first border and the second border connected by a perpendicular third border, the three notch elements are each defined by three wall elements.

11. The improved sealing ring component for a pool light niche housing according to claim 10, wherein a first notch element is defined by a first wall substantially parallel to a second wall connected by perpendicular third wall, and a second notch element is defined by a fourth wall substantially parallel to a fifth wall connected by perpendicular sixth wall, and a third notch element is defined by a seventh wall substantially parallel to a eighth wall connected by perpendicular ninth wall.

12. The improved sealing ring component for a pool light niche housing according to claim 9 fabricated from nickel plated aluminum.

* * * * *